(12) United States Patent
Merritt (10) Patent No.: US 11,575,524 B2
(45) Date of Patent: *Feb. 7, 2023

(54) SELECTIVE ENCRYPTION DELINEATION

(71) Applicant: ServiceNow, Inc., Santa Clara, CA (US)

(72) Inventor: Norris Merritt, Del Mar, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,492

(22) Filed: Jul. 8, 2021

(65) Prior Publication Data

US 2023/0011742 A1    Jan. 12, 2023

Related U.S. Application Data

(63) Continuation of application No. 16/803,773, filed on Feb. 27, 2020, now Pat. No. 11,095,615, which is a
(Continued)

(51) Int. Cl.
*H04L 9/36* (2006.01)
*H04L 9/00* (2022.01)
*H04L 9/06* (2006.01)

(52) U.S. Cl.
CPC ............... *H04L 9/36* (2013.01); *H04L 9/065* (2013.01); *H04L 2209/34* (2013.01); *H04L 2209/76* (2013.01)

(58) Field of Classification Search
CPC ....... H04L 9/36; H04L 9/065; H04L 2209/34; H04L 2209/76
See application file for complete search history.

(56) References Cited

U.S. PATENT DOCUMENTS 6,978,367 B1  12/2005  Hind et al.
7,020,706 B2  3/2006  Cates
(Continued)

FOREIGN PATENT DOCUMENTS

EP  1562099 A1  8/2005
EP  1310115 B1  4/2006
(Continued)

OTHER PUBLICATIONS

Unicode: Frequently Asked Questions, "Private-Use Characters, Noncharacers & Sentinels FAQ", downloaded Jun. 10, 2016, 12 pp., http://www.unicode.org.faq/private_use.html.

*Primary Examiner* — Hosuk Song
(74) *Attorney, Agent, or Firm* — Fletcher Yoder PC (57) ABSTRACT

Decoding a partially encrypted data stream may include receiving and scanning the partially encrypted data stream. Scanning the partially encrypted data stream may include identifying an encrypted portion sentinel in the partially encrypted data stream subsequent to a first portion, identifying an encrypted portion in the partially encrypted data stream subsequent to the encrypted portion sentinel, and generating a decrypted data portion by decrypting the encrypted portion. Decrypting the encrypted portion may include identifying an encrypted data portion in the encrypted portion, the encrypted data portion omitting an end encrypted portion sentinel, decrypting the encrypted data portion, and identifying an end encrypted portion sentinel in the encrypted portion subsequent to the encrypted data portion. Decoding the partially encrypted data stream may include including the decrypted data portion in the decrypted output data stream, and outputting the decrypted output data stream to a client device in the second network domain.

20 Claims, 6 Drawing Sheets

Related U.S. Application Data continuation of application No. 15/190,512, filed on Jun. 23, 2016, now Pat. No. 10,601,781.

(60) Provisional application No. 62/240,232, filed on Oct. 12, 2015.

(56) References Cited

U.S. PATENT DOCUMENTS

| | | | |
|---|---|---|---|
| 7,076,521 B2 | 7/2006 | Davison | |
| 7,165,175 B1 | 1/2007 | Kolimyer et al. | |
| 7,536,391 B2 | 5/2009 | Christian et al. | |
| 7,716,353 B2 | 5/2010 | Golovinsky | |
| 7,769,718 B2 | 8/2010 | Murley | |
| 7,797,342 B2 | 9/2010 | Banks et al. | |
| 7,805,464 B2 | 9/2010 | McKee et al. | |
| 7,831,127 B2 | 11/2010 | Wilkinson | |
| 8,135,948 B2 | 3/2012 | Shulman et al. | |
| 8,266,438 B2 | 9/2012 | Orsini et al. | |
| 8,402,127 B2 | 3/2013 | Solin | |
| 8,533,328 B2 | 9/2013 | Jeon | |
| 8,612,408 B2 | 12/2013 | Trinon | |
| 8,694,646 B1 | 4/2014 | Kothari et al. | |
| 8,832,652 B2 | 9/2014 | Mueller | |
| 8,924,739 B2 | 12/2014 | Horn et al. | |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,535,737 B2 | 1/2017 | Joy | |
| 9,596,075 B2 * | 3/2017 | Winslow | H04L 9/12 |
| 9,641,322 B2 | 5/2017 | Ducharme | |
| 9,645,833 B2 | 5/2017 | Mueller | |
| 9,654,473 B2 | 5/2017 | Miller | |
| 9,660,803 B2 * | 5/2017 | Chalker | H04L 9/12 |
| 9,766,935 B2 | 9/2017 | Kelkar | |
| 9,805,322 B2 | 10/2017 | Kelkar | |
| 10,375,030 B2 * | 8/2019 | Penugonda | H04L 65/762 |
| 10,601,781 B2 * | 3/2020 | Merritt | H04L 9/36 |
| 10,992,461 B2 * | 4/2021 | Racz | H04L 9/30 |
| 11,095,615 B2 * | 8/2021 | Merritt | H04L 9/06 |
| 2003/0014528 A1 | 1/2003 | Crutcher et al. | |
| 2004/0257591 A1 | 12/2004 | Engelman et al. | |
| 2006/0210071 A1 | 9/2006 | Chandran et al. | |
| 2007/0101120 A1 | 5/2007 | Patel et al. | |
| 2008/0052533 A1 | 2/2008 | Iida et al. | |
| 2009/0290580 A1 | 11/2009 | Wood et al. | |
| 2012/0072918 A1 | 3/2012 | Zhong et al. | |
| 2012/0124372 A1 | 5/2012 | Dilley et al. | |
| 2012/0204036 A1 | 8/2012 | Wack et al. | |
| 2013/0064283 A1 | 3/2013 | Sun et al. | |
| 2014/0373165 A1 | 12/2014 | Margolin | |
| 2015/0149785 A1 | 5/2015 | Pickering et al. | |
| 2015/0256898 A1 | 9/2015 | Morton et al. | |
| 2016/0134549 A1 | 5/2016 | Abel et al. | |
| 2016/0315762 A1 | 10/2016 | Moon et al. | |

FOREIGN PATENT DOCUMENTS

| | | |
|---|---|---|
| EP | 2627095 A1 | 8/2013 |
| WO | 200201389 A2 | 1/2002 |
| WO | 2010029559 A1 | 3/2010 |

* cited by examiner

SELECTIVE ENCRYPTION DELINEATION

CROSS-REFERENCE TO RELATED APPLICATION(S)

This application is a continuation of U.S. application Ser. No. 16/803,773 filed Feb. 27, 2020; which is a continuation of U.S. application Ser. No. 15/190,512 filed Jun. 23, 2016 (now U.S. Pat. No. 10,601,781); which claims priority to U.S. Provisional Patent Application No. 62/240,232, filed on Oct. 12, 2015, all of which are herein incorporated by reference in their entirety.

TECHNICAL FIELD

The present disclosure is generally related to information technology, and in particular to computer-implemented methods, systems, and apparatuses to delineate encrypted portions of a selectively encrypted data stream in an electronic computing and communication system.

BACKGROUND

An electronic computing and communication system may include one or more communicating and computing elements, which may, in the course of communicating and computing, exchange messages including a mixture of sensitive and insensitive data. Accordingly, a method and apparatus for delineating encrypted portions of a selectively encrypted data stream may be advantageous.

SUMMARY

Disclosed herein are aspects of selective encryption delineation.

According to an implementation, a method is provided for decoding a partially encrypted data stream. Decoding a partially encrypted data stream may include receiving a partially encrypted data stream, and scanning the partially encrypted data stream. Scanning the partially encrypted data stream may include identifying a first portion of the partially encrypted data stream, wherein the first portion omits an encrypted portion sentinel, including the first portion in a decrypted output data stream, identifying an encrypted portion sentinel in the partially encrypted data stream subsequent to the first portion, identifying an encrypted portion in the partially encrypted data stream subsequent to the encrypted portion sentinel, and generating a decrypted data portion by decrypting the encrypted portion. Decrypting the encrypted portion may include identifying an encrypted data portion in the encrypted portion, the encrypted data portion omitting an end encrypted portion sentinel, decrypting the encrypted data portion, and identifying an end encrypted portion sentinel in the encrypted portion subsequent to the encrypted data portion. Decoding the partially encrypted data stream may include including the decrypted data portion in the decrypted output data stream, and outputting the decrypted output data stream to a client device in the second network domain.

According to an implementation, a method is provided for delineating encrypted portions of a selectively encrypted data stream. Delineating encrypted portions of a selectively encrypted data stream may include generating a partially encrypted data stream, and outputting the partially encrypted data stream. Generating the partially encrypted data stream may include identifying an unencrypted input data portion, including the first unencrypted input portion in the partially encrypted data stream, identifying an encrypted input data portion, including an encrypted portion sentinel in the partially encrypted data stream subsequent to the first unencrypted input portion, including the encrypted input data portion in the partially encrypted data stream subsequent to the encrypted portion sentinel, and including an end encrypted portion sentinel in the partially encrypted data stream subsequent to the encrypted input data portion.

According to an implementation, a non-transitory computer-readable storage medium, comprising executable instructions that, when executed by a processor, facilitate performance of operations, comprising selective encryption delineation is provided. Selective encryption delineation may include receiving, at an edge encryption proxy in a first network domain, from a client device in the first network domain, a first request for information, which may indicate a remote server in a second network domain, and transmitting a second request for the information to the remote server on behalf of the client. Selective encryption delineation may include, in response to transmitting the second request to the remote server, receiving, from the remote server, at the edge encryption proxy, a partially encrypted data stream, identifying a first portion of the partially encrypted data stream, wherein the first portion omits an encrypted portion sentinel, and including the first portion in a decrypted output data stream. Selective encryption delineation may include identifying an encrypted portion sentinel in the partially encrypted data stream subsequent to the first portion, identifying an encrypted portion in the partially encrypted data stream subsequent to the encrypted portion sentinel, and generating a decrypted data portion by decrypting the encrypted portion. Decrypting the encrypted portion may include identifying an encrypted data portion in the encrypted portion, the encrypted data portion omitting an end encrypted portion sentinel, generating a decrypted data portion by decrypting the encrypted data portion, such that the decrypted data portion includes at least a portion of the information, and identifying an end encrypted portion sentinel in the encrypted portion subsequent to the encrypted data portion. Selective encryption delineation may include including the decrypted data portion in the decrypted output data stream, and outputting the decrypted output data stream to the client device as a response to the first request.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views, and wherein.

DETAILED DESCRIPTION

An electronic computing and communication system may include many elements, such as computers, routers, switches, servers, and the like, in communication internally, within the electronic computing and communication system or network domain, and externally, with elements outside the electronic computing and communication system or network domain. The communications may include sensitive information. In order to prevent unauthorized access to the sensitive information, the sensitive information may be encrypted. Thus, the communications may include a mixture of unencrypted and encrypted data. Accordingly, the methods and apparatus disclosed herein may enable the low cost, low latency, inclusion and detection of encrypted portions in partially encrypted data streams.

In some embodiments, selective encryption delineation may allow for rapid decryption of partially encrypted data with low resource utilization and complexity, and little or no latency. For simplicity and clarity, a communication that includes a mixture of unencrypted and encrypted data may be referred to herein as a partially, or selectively, encrypted string, a partially, or selectively, encrypted message, or partially, or selectively, encrypted data.

The preceding overview is provided to enable a basic or general understanding of various aspects of the non-limiting embodiments that follow and the accompanying drawings. This overview is not intended as an exhaustive or complete description. Instead, the purpose of this overview is to introduce some concepts of this disclosure as a prelude to the following more detailed descriptions of the various embodiments.

Figure 1:
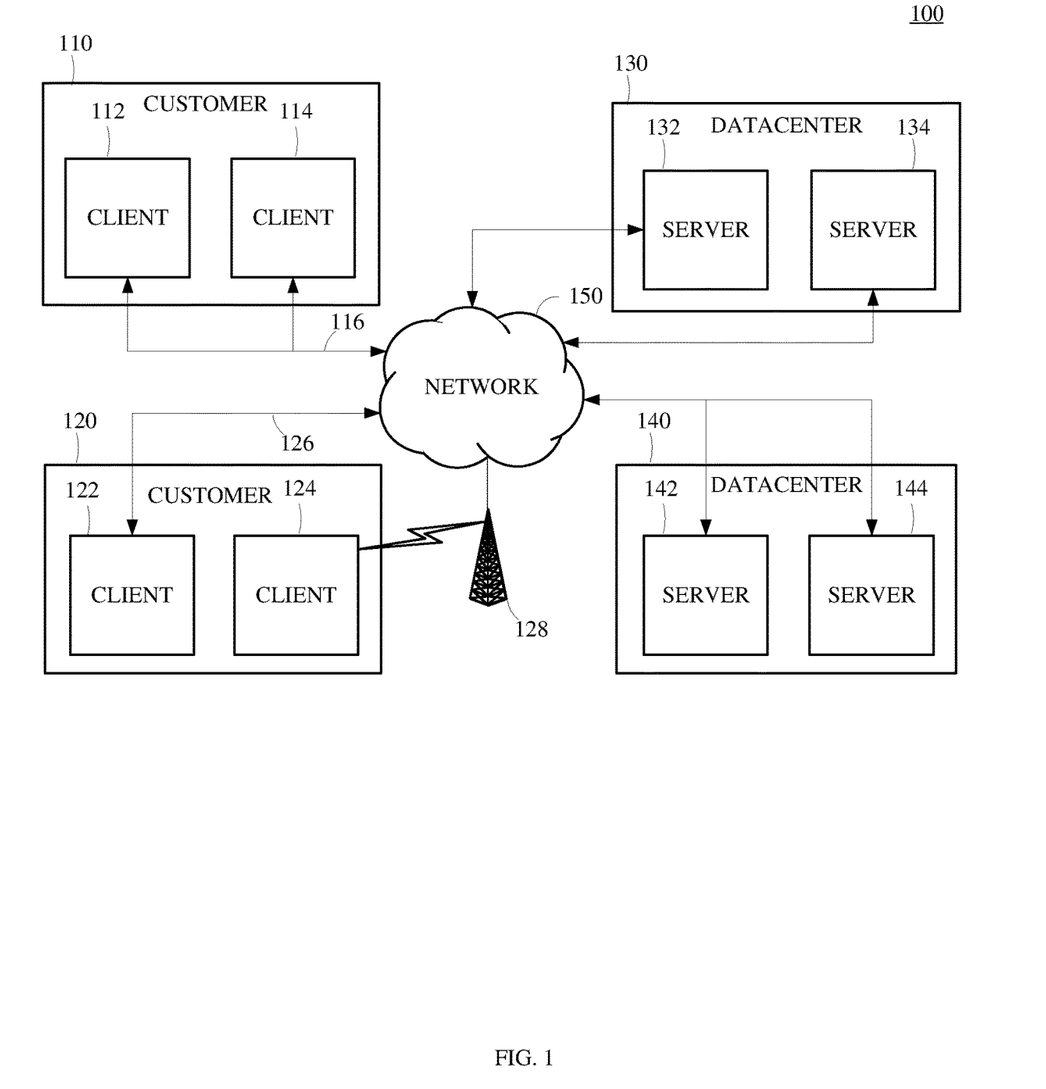
FIG. 1 is a schematic of an example of a cloud computing system in accordance with this disclosure.

FIG. 1 is a diagram of an example of an electronic computing and communication system 100 in accordance with this disclosure. As used herein, the term 'electronic computing and communication system', or variations thereof, may be, or include, a distributed computing system, such as a client-server computing system, a cloud computing system, a clustered computing system, or the like.

An electronic computing and communication system 100 can include customers, such as customers 110 and 120. A customer may have clients, such as clients 112, 114 for customer 110 and clients 122, 124 for customer 120. A client 112/114/122/124 may be a computing system, which may include one or more computing devices, such as a mobile phone, a tablet computer, a laptop computer, a notebook computer, a desktop computer, or any other computing device, or combination of computing devices. In some embodiments, client be implemented as a single physical unit, or a combination of physical units. In some embodiments, a single physical unit may include multiple clients. For example, a client 112/114/122/124 may be an instance of an application or program running on a customer device. Although two customers 110/120, each having two clients 112/114/122/124, are shown in FIG. 1, an electronic computing and communication system may include any number of customers or clients or may have a different configuration of customers or clients. For example, there may be hundreds or thousands of customers and each customer may have any number of clients. Although not shown separately in FIG. 1, a customer 110/120 may include a customer network or domain. For example, the clients 112/114 of a customer 110, may be within a customer network or domain.

The electronic computing and communication system 100 can include one or more datacenters, such as the two datacenters 130/140 shown. A datacenter may include servers, such as the two servers 132/134 shown for datacenter 130, or the two servers 142/144 shown for bottom datacenter 140. A datacenter 130/140 may represent a geographic location, which may include a facility, where servers are located. A server 132/134/142/144 may be a computing system, which may include one or more computing devices, such as a desktop computer, a server computer, or any other computer capable of operating as a server. Although two datacenters 130/140, each including two servers 132/134/142/144 are shown in FIG. 1, an electronic computing and communication system may have any number of datacenters and servers or may have a different configuration of datacenters and servers. For example, there may be tens of data centers and each data center may have hundreds or any number of servers. Although not shown expressly in FIG. 1, each datacenter 130/140 may correspond with one or more datacenter networks or domains, which may be domains other than the client domain.

Clients 112/114/122/124 and servers 132/13/142/144 may be configured to connect to, or communicate via, a network 150. In some implementations, the clients 112/114 of a customer 110 may connect to the network 150 via a communal connection point, link, or path 116. In some implementations, one or more clients 122/124 of a customer 120 may connect to, or communicate via, the network 150 using distinct connection points, links, or paths 126/128. A connection point, link, or path may be wired, as shown by links 116/126, wireless, as shown by connection point 128, or may include a combination of wired and wireless mediums.

The network 150 can, for example, be the Internet. In some embodiments, the network 150 may be, or include, a local area network (LAN), a wide area network (WAN), a virtual private network (VPN), or any other means of electronic computer communication capable of transferring data between any of clients 112/114/122/124 and servers 132/134/142/144. The network 150, the datacenters 130/140, or any other element, or combination of elements, of the electronic computing and communication system 100 may include network hardware such as routers, switches, load balancers, other network devices, or combinations thereof. For example, each of datacenters 130/140 may include one or more load balancers for routing traffic from network 150 to various servers, such as servers 132/134/142/144.

Other implementations of the electronic computing and communication system may be used. For example, devices other than the clients 112/114/122/124 and servers 132/134/142/144 shown may be included in the electronic computing and communication system 100. In an implementation, one or more additional servers may operate as an electronic computing and communication system infrastructure control, from which servers, clients, or both, may be monitored, controlled, configured, or a combination thereof. For example, some or all of the techniques described herein may operate on the electronic computing and communication system servers.

In some embodiments, one or more of the elements of the electronic computing and communication system 100, such as the clients 112/114/122/124 or the servers 132/134/142/144, may be configured to store, manage, and provide one or more databases, tables, or other information sources, or a portion thereof, such as a configuration management database (CMDB), a management information base (MIB), or a combination thereof. A configuration management database may include records representing one or more entities, devices, or units of the electronic computing and communication system, such as the clients 112/114/122/124, the customers 110/120, the datacenters 130/140, the servers 132/134/142/144, the access point 128, the network 150, or any other element, portion of an element, or combination of elements of the electronic computing and communication system 100. The configuration management database may include information describing the configuration, the role, or both, of an element of the electronic computing and communication system 100. In some embodiments, a management information base may include one or more databases listing characteristics of the elements of the electronic computing and communication system 100. In some embodiments, an object identifier (OID) may represent object identifiers of objects or elements in the MIB.

In some embodiments, the techniques and methods described herein, portions thereof, or combinations thereof, may be implemented on a single device, such as a single server, or a combination of devices, such as a combination of clients 112/114/122/124 and servers 132/134/142/144.

Figure 2:
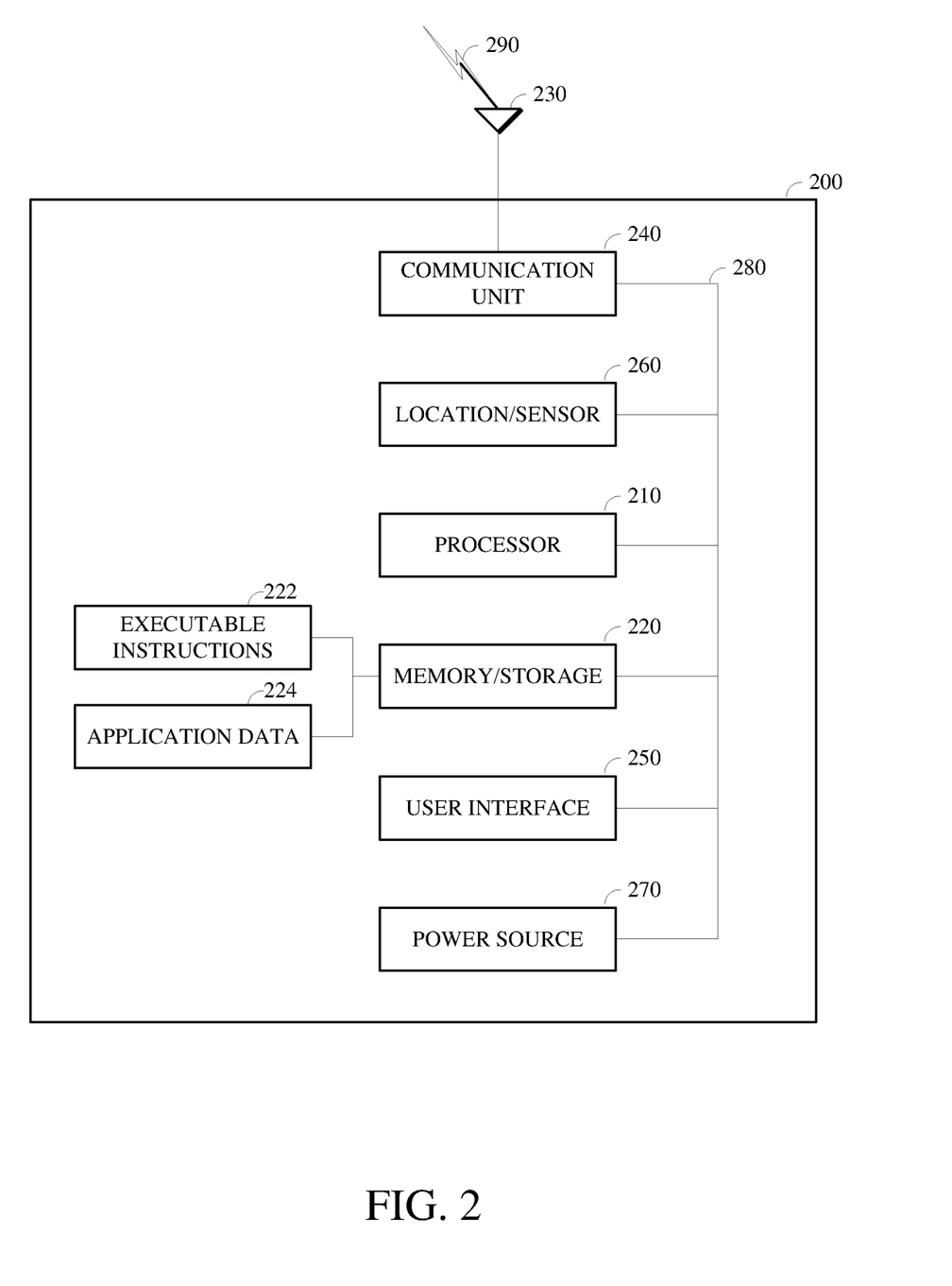
FIG. 2 is a block diagram of an example internal configuration of a computing device in accordance with this disclosure.

FIG. 2 is a block diagram of an example internal configuration of a computing device 200, such as a client 112/114/122/124 or a server 132/134/142/144 of the electronic computing and communication system 100 shown in FIG. 1. As previously described, a client or server may be a computing system including multiple computing devices, or a single computing device, such as a mobile phone, a tablet computer, a laptop computer, a notebook computer, a desktop computer, a server computer, or the like.

A computing device 200 can include components or units, such as a processor 210, memory 220, a network communication unit 230, a network communication interface 240, a user interface 250, a sensor unit 260, a power source 270, a bus 280, or a combination thereof.

The processor 210 can be a central processing unit (CPU), such as a microprocessor, and can include single or multiple processors, each having single or multiple processing cores. The processor 210 can include single or multiple processors each having single or multiple processing cores. Alternatively, the processor 210 can include another type of device, or multiple devices, capable of manipulating or processing information now-existing or hereafter developed. For example, the processor 210 may include multiple processors interconnected in any manner, including hardwired or networked, including wirelessly networked. In some embodiments, the operations of the processor 210 can be distributed across multiple physical devices or units that can be coupled directly or across a local area or other network.

In some embodiments, the memory 220 may include volatile memory, non-volatile memory, or a combination thereof. For example, the memory 220 may include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some embodiments, the memory 220 can include another type of device, or multiple devices, capable of storing data or instructions for processing by the processor 210, now-existing or hereafter developed. The processor 210 may access and manipulate data in the memory 220 via the bus 280.

The memory 220 can include executable instructions 222, data, such as application data 224, or a combination thereof, for immediate access by the processor 210. The executable instructions 222 can include, for example, an operating system and one or more application programs, which may be loaded or copied, in whole or in part, from non-volatile memory to volatile memory to be executed by the processor 210. The executable instructions 222 may be organized into programmable modules or algorithms, functional programs, codes, code segments, or combinations thereof, to perform various functions described herein. The operating system can be, for example, Microsoft Windows®, Mac OS X®, Linux®, or an operating system for a small device, such as a smart phone or tablet device, or a large device, such as a mainframe computer. Functional programs can include, for example, a web browser, a web server, a database server, or a combination thereof. The application data 224 can include, for example, user files, database catalogs, and configuration information. The memory 220 may include executable instructions 222, application data 224, or a combination thereof for implementing the techniques described herein. The memory 220 may comprise one or multiple devices and may utilize one or more types of storage, such as solid state or magnetic.

The network communication unit 240 can be coupled to the processor 210 via the bus 280. In some embodiments, network communication unit 240 can comprise one or more transceivers. The network communication unit 240 can, for example, provide a connection or link to a network, such as the network 150 shown in FIG. 1, via the network communication interface 230, which may be a wired network interface, such as Ethernet, or a wireless network interface (as shown). For example, the computing device 200 may communicate with other devices via the network communication unit 240 and the network interface 230 using one or more network protocols, such as Ethernet, TCP/IP, power line communication (PLC), WiFi, infrared, GPRS/GSM, CDMA, or the like.

A user interface 250 can include a display, a positional input device, such as a mouse, touchpad, touchscreen, or the like, a keyboard, or any other human and machine interface devices. The user interface 250 can be coupled to the processor 210 via the bus 280. Other interface devices that permit a user to program or otherwise use the computing device 200 can be provided in addition to or as an alternative to a display. In some embodiments, the user interface 250 may include a display, which may be a liquid crystal display (LCD), a cathode-ray tube (CRT), a light emitting diode (LED) display, such as an OLED display, or the like.

Although a single sensor 260 is shown, a computing device 200 may contain any number of sensors and detectors 260, which may monitor the device 200 itself or the environment around the device 200. For example, a computing device 200 may contain a geospatial location identification unit 260, such as a global positioning system (GPS) location unit. In some embodiments, the power source 270 may be a battery, and the computing device 200 may operate independently of an external power distribution system. Any of the components of the computing device 200, such as the sensor 260 or the power source 270 may communicate with the processor 210 via the bus 280.

Other implementations of the internal architecture of clients and servers may be used. For example, a server may omit the location unit 260. The operations of the processor 210 can be distributed across multiple machines which can be coupled directly or across a local area or other network. The memory 220 can be distributed across multiple machines such as network-based memory or memory in multiple machines performing the operations of clients or servers. Although depicted here as a single bus, the bus 280 can be composed of multiple buses, that may be connected to each other through various bridges, controllers, and/or adapters.

Figure 3:
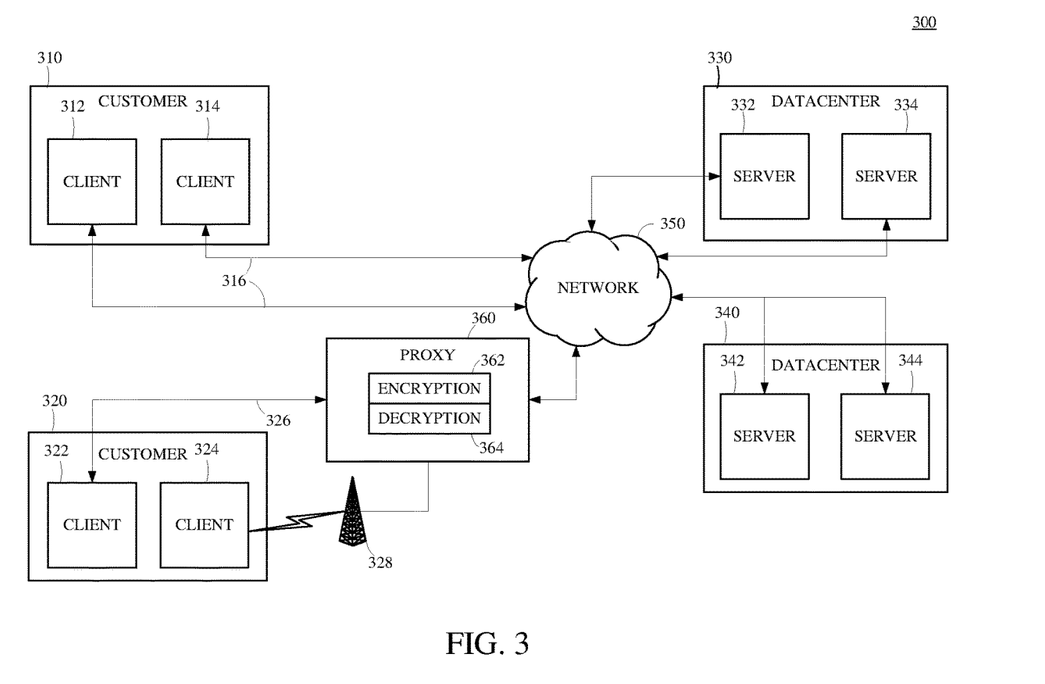
FIG. 3 is a schematic of another example of a cloud computing system in accordance with this disclosure.

FIG. 3 is a schematic of an example of an electronic computing and communication system for encrypting and decrypting partially encrypted data using selective encryption delineation in accordance with this disclosure. The electronic computing and communication system 300 may be similar to the electronic computing and communication system 100 shown in FIG. 1, except as described herein.

In some embodiments, the electronic computing and communication system 300 can include customers, such as customers 310 and 320. A customer may have clients, such as clients 312, 314 for customer 310 and clients 322, 324 for customer 320. The electronic computing and communication system 300 can include datacenters 330/340, which may include servers 332/334/342/344. Clients 312/314/322/324 and servers 332/13/342/344 may be configured to connect to a network 350.

In some embodiments, the electronic computing and communication system 300 may include a proxy 360, or gateway. The proxy 360 may be a device operating on the communication path or paths between internal elements, such as the clients 322/324, operating within the customer network or domain 320, and external elements, such as the servers 332/334/342/344, operating outside the customer system 320. In some embodiments, the communication path between internal elements and external elements may include one or more insecure portions, such as the Internet 350.

In some embodiments, the proxy 360 may be an edge encryption proxy, and may include an encryption unit 362, a decryption unit 364, or both. For example, the proxy 360 may be an edge encryption proxy and may intercept communications between internal elements, such the clients 322/324, operating within the customer network or domain 320, and external elements, such as the servers 332/334/342/344, operating outside the customer system 320. For simplicity and clarity, communications sent from internal elements, such the clients 322/324, to external elements, such as the servers 332/334/342/344, received or intercepted by the proxy 360 may be referred to herein as outbound data, outbound communications, outbound messages, or outbound information, and communications sent from external elements, such as the servers 332/334/342/344, to internal elements, such the clients 322/324, received or intercepted by the proxy 360 may be referred to herein as inbound data, inbound communications, inbound messages, or inbound information. In some embodiments, the proxy 360 may relay, forward, or route inbound communications, outbound communications, or both. In some embodiments, the proxy 360 may be transparent to the client 322/324.

Figure 4:
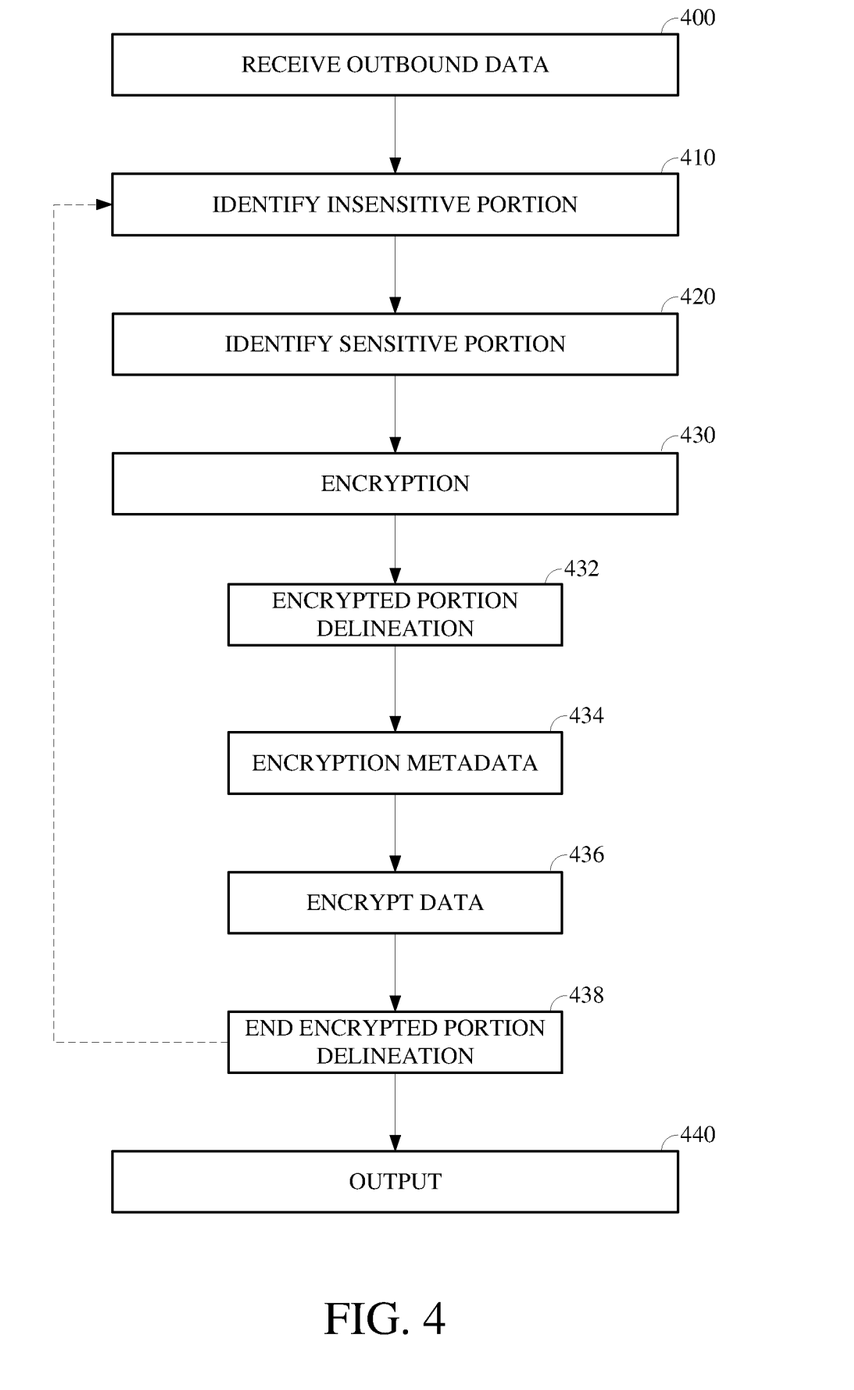
FIG. 4 is a diagram of an example of encrypting data using selective encryption delineation in accordance with this disclosure.

In some embodiments, the proxy 360 may intercept outbound messages sent by internal elements, and may send corresponding communications to external elements on behalf of the internal elements, as shown in FIG. 4. For example, a client, such the clients 322/324, may send a message to a server, such as one of the servers 332/334/342/344, the proxy 360 may intercept the outbound message, determine that the outbound message include sensitive information, generate an encrypted, or partially encrypted, message corresponding to the outbound message, and send the encrypted, or partially encrypted, data to the server on behalf of the client.

Figure 5:
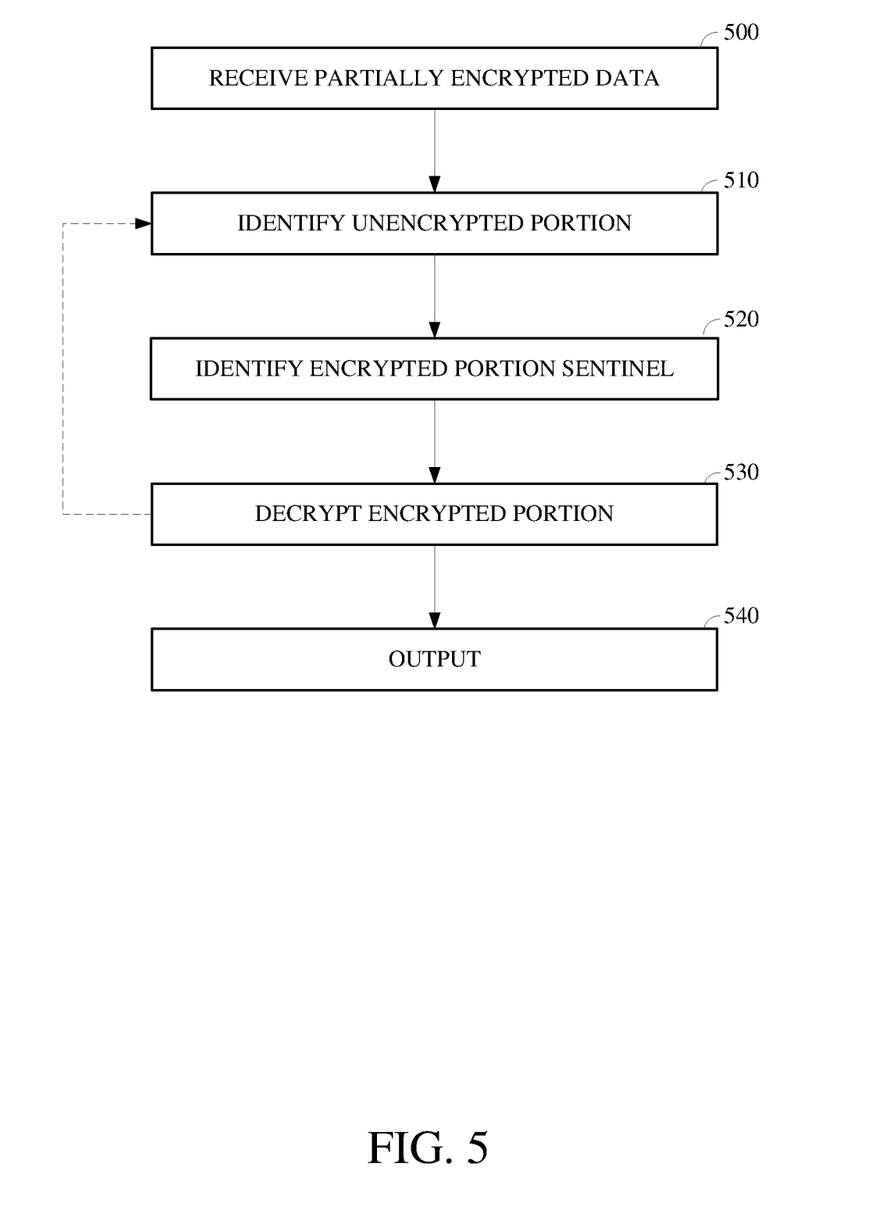
FIG. 5 is a diagram of an example of decrypting partially encrypted data using selective encryption delineation in accordance with this disclosure.

In some embodiments, the proxy 360 may intercept inbound messages sent by external elements, and may send corresponding communications to internal elements, as shown in FIG. 5. For example, a server, such as one of the servers 332/334/342/344, may send a message to a client, such the clients 322/324, the proxy 360 may intercept the inbound message, determine that the inbound message include encrypted information, generate a decrypted message corresponding to the inbound message, and send the decrypted data to the client.

For simplicity and clarity, outbound messages received at, or intercepted by, the proxy 360 are described herein as including unencrypted data, such as clear text; however, the outbound messages may include encrypted data. Similarly, data sent to internal elements, such as the clients 322/324 by the proxy 360 are described herein as decrypted data; however, the decrypted data may include data encrypted using a technique other than selective encryption delineation.

For example, a client 322/324 may encrypt data using a first encryption key, to generate first encrypted data. The client 322/324 may send outbound data, including the first encrypted data, to one of the servers 332/334/342/344. The proxy 360 may intercept and encrypt the outbound data, or a portion thereof, which may include the first encrypted data, using a second encryption key, to generate second encrypted data. The proxy 360 may send the output, which may include the second encrypted data, to the server 332/334/342/344. Subsequently, the server 332/334/342/344 may send inbound data, which may include the second encrypted data, to the client 322/324. The proxy 360 may intercept the inbound data and may decrypt the second encrypted data to generate first decrypted data, which may include the first encrypted data. The proxy 360 may send the first decrypted data to the client 322/324. The client 322/324 may receive the first decrypted data, including the first encrypted data, and may decrypt the first encrypted data to generate second decrypted data.

FIG. 4 is a diagram of an example of encrypting data using selective encryption delineation in accordance with this disclosure. In some embodiments, encrypting data using selective encryption delineation may be implemented on a device, such as the proxy 310 shown in FIG. 3. In some embodiments, encrypting data using selective encryption delineation may include receiving data at 400, identifying insensitive data at 410, identifying sensitive data at 420, encrypting the sensitive data at 430, outputting the partially encrypted data at 440, or a combination thereof.

In some embodiments, data may be received for encryption at 400. For example, a proxy device, such as the proxy 310 shown in FIG. 3, may be a member of, or operate within, a domain, such as the customer domain 320 shown in FIG. 3, and may receive outbound data from a device in the domain, such as a client 322/324 in the customer domain 320 as shown in FIG. 3. In some embodiments, the outbound data may include unencrypted data, data encrypted via an external method, or a combination thereof. For simplicity and clarity, outbound data encrypted via an external method may be considered to be unencrypted data herein, except as otherwise indicated. In some embodiments, the proxy device may be a member of, or operate within a network or domain other than the customer domain. For example, a client device, which may be operating within the customer domain or another domain, may transmit outbound data to a server, which may be outside the customer domain or within the customer domain, and the request may be redirected, such as via a domain name system (DNS) redirect, to a proxy device, which may be operating outside the customer domain. In some embodiments, the proxy device may validate the client device, such as via a log in process.

For example, the outbound data may include a request, such as a Hypertext Transfer Protocol (HTTP) 'GET' request or an HTTP 'POST', to a server outside the customer domain. The request may be intercepted by the proxy, which may transmit a corresponding request including encrypted, or partially encrypted, data to the server on behalf of the client. For simplicity and clarity outbound data is described herein in the context of HTTP GET or HTTP POST messages; however, other message types, such as HTTP OPTIONS, HEAD, PUT, DELETE, or the like, may be used.

In some embodiments, the outbound data may include information organized according to one or more protocols, such as Hypertext Markup Language (HTML, Extensible Markup Language (XML), JavaScript Object Notation (JSON), Simple Object Access Protocol (SOAP), or any other communication protocol or combination of communication protocols. For example, a message from a client, in the customer domain, to a server, in an external domain, may include a Uniform Resource Locator (URL), such as the following:

HTTP://www.example.com/path?param1=one&param2=two&protocol={"param3"."three"; "param4"."four"}.

Example 1

In Example 1, the first portion from the left "HTTP" may indicate a protocol, such as the HTTP protocol. Although the examples herein use the HTTP protocol, other protocols may be used, such as the File Transfer Protocol (FTP), or the HTTP secure (HTTPS) protocol. The first portion of the URL may be delineated from the second portion of the URL by a delimiter, such as "://". The second portion of the URL, "www.example.com", may indicate elements of a target domain, such as the top-level domain ".com", the domain "example", and the subdomain "www". The subdomain, domain, and top-level domain may each be delineated by a delimiter, such as a period ".". The second portion of the URL may be delineated from the third portion of the URL by the delimiter "I". The third portion of the URL, "path" may indicate a location or path within the target domain. The third portion of the URL may be delineated from the fourth portion of the URL by a delimiter, such as the question mark "?". In some embodiments, the portion of the URL to the right of the "?" delimiter may be referred to as the parameter string, or the parameters. The forth portion "?param1=one&param2=two&protocol={"param3"."three"; "param4"."four"}" may include multiple parameters, which may be formatted as name and value tuples. Individual parameters may be delineated by a delimiter, such as the ampersand "&" or the semicolon ";". The name and value of a tuple may be delineated by a delimiter, such as the equals sign "=". For example, a first parameter in the URL includes the "param1=one", wherein the first portion of the parameter, "param1" indicates the name of the parameter, and the second portion "one" indicates the value of the parameter. In some embodiments, the value of a parameter may include information formatted according to another protocol. For example, the fourth portion of the URL shown includes the parameter "protocol={"param3"."three"; "param4"."four"}", in which the first part, "protocol", may include the name of the other protocol, such JSON or SOAP, and the second portion, "protocol={"param3"."three"; "param4"."four"}", may include one or more parameters in the corresponding protocol, such as ""param3"."three"", and ""param4"."four"".

Although an HTTP formatted URL is shown as an example herein, any communication format, syntax, or protocol may be used. In some embodiments, a message, such as an HTTP POST message may include a portion, such as a body portion or an entity body portion, which may include an arbitrarily large amount of data. The data in the body portion may be formatted in accordance with respective syntax or protocol corresponding to the type of data. The data stream may include a header portion, such as a "Content Type" header, prior to the body portion, which may indicate the type of data. Encoding and decoding of the body portion and corresponding headers may be similar to the encoding and decoding of a URL data stream as described herein.

In some embodiments, the outbound data received at 400, or portions thereof, may be received as an array or stream of bytes.

In some embodiments, the outbound data received at 400 may be scanned at 410. In some embodiments, the proxy may include an encryption unit, which may include a state machine, and scanning the outbound data may include entering an unencrypted state in response to receiving the outbound data.

In some embodiments, receiving the outbound data at 400 may include scanning the outbound data to identify sensitive portions. In some embodiments, the outbound data received at 400 may include sensitive information, insensitive information, or a combination of sensitive and insensitive information. For example, one or more of the portions of the outbound data may be designated as insensitive. Insensitive data may be data that may be transmitted outside the customer domain without encryption. For example, the outbound data may include an HTTP GET request that includes a URL that includes parameters as shown in Equation 1, and the name of one or more of the parameters, such as "param1" or "param2", may be designated as insensitive and may be transmitted in an unencrypted form. In some embodiments, one or more portion of the outbound data may be designated as sensitive. Sensitive data may be data for which encryption is indicated prior to transmission outside the customer domain. For example, the outbound data may include an HTTP GET request that includes a URL that includes parameters as shown in Equation 1, and the value of the one or more of the parameters, such as "one" or "four", may be designated as sensitive and may be encrypted prior to transmission.

In some embodiments, an insensitive portion may be identified at 410. For example, a first portion of the outbound data may be an insensitive portion and may be identified at 410. In some embodiments, the proxy may receive the outbound data at 400, may enter an unencrypted state in response to receiving the outbound data, may determine that a first portion of the outbound data does not include sensitive information, and may include the corresponding portion of the outbound data in a partially encrypted output data stream, or an output buffer for subsequent inclusion in the output data stream. For example, the outbound data may include an HTTP GET request that includes a URL that includes parameters as shown in Equation 1, and a first portion of the outbound data, such as "HTTP://www.example.com/path?param1=", may be identified as an insensitive portion.

In some embodiments, a sensitive portion may be identified at 420. For example, a second portion of the outbound data, subsequent to the first portion, such as the value "one" shown in Example 1, may be a sensitive portion and may be identified at 420. In some embodiments, the proxy, or a state machine of the proxy, may enter an encrypted state in response to identifying the sensitive data at 420.

In some embodiments, the sensitive portion may be encrypted at 430. In some embodiments, encrypting the sensitive portion at 430 may include delineating the encrypted data at 432, generating encryption metadata at 434, encrypting the sensitive data at 436, delineating an end of the encrypted data at 438, or a combination thereof.

In some embodiments, an encrypted portion delineator, such as an encryption sentinel, encrypted portion sentinel, may be output at 432. For example, an encryption sentinel may be included, subsequent to the insensitive portion included at 420, in the partially encrypted output data stream, or the output buffer.

In some embodiments, the encryption sentinel may be a value or sequences of values that cannot be otherwise included in, or is statistically unlikely to be otherwise included in, the data stream. For example, in some embodiments, an encryption sentinel may be implemented as a long arbitrary collection of characters, the length and composition of which make it very unlikely that such a sequence would otherwise appear in the data stream in encrypted, unencrypted, or partially encrypted, form. In order to ensure that it is very unlikely that such a sequence would otherwise appear in the data stream, such a sequence may be relatively long, such as a sequence including twenty or more characters.

In some embodiments, an encryption sentinel may be implemented as a defined value that does not otherwise appear in the data stream, such as a Unicode private character or non-character. For example, the data stream, in encrypted, unencrypted, or partially encrypted form, may include characters encoded according to a defined encoding scheme, such as the Unicode character encoding standard, and the beginning of an encrypted portion may be delineated using a non-character encrypted portion sentinel, which may be a valid code in the defined encoding scheme. In an example, the non-character encrypted portion sentinel may be "\uFDD0\uFDD1".

In some embodiments, encrypting the sensitive information at 430 may include generating one or more parameters, or fields, describing the encrypted data, which may be referred to herein as encryption metadata, at 434. In some embodiments, the encryption metadata may be output as unencrypted data. The encryption metadata may, for example, include information for use in decrypting the encrypted data, such as an order-preserving token, an identification of an encryption algorithm used for encrypting the encrypted data, a symbolic name or alias that identifies an encryption key for encrypting or decrypting the encrypted data, or the like. Each metadata parameter, field, or element may be delimited using a respective defined encryption metadata start sentinel and a corresponding defined encryption metadata end sentinel. The encryption metadata start and end sentinels may be a private, or non-character, Unicode values, or a respective sequences thereof. In some embodiments, the encrypted data may be included, subsequent to the encryption metadata, in the partially encrypted output data stream, or output buffer.

In some embodiments, one or more portions of sensitive information identified at 420, may be encrypted at 436. In some embodiments, encrypting the sensitive information at 436 may include outputting encrypted data. For example, the encrypted data may be included, subsequent to the encrypted portion sentinel included at 432 and the encryption metadata included at 434, in the partially encrypted output data stream, or output buffer.

In some embodiments, encrypting the unencrypted outbound sensitive data may include using an encryption cipher to generate binary data. In some embodiments, the binary data may be base64-encoded, which may produce a sequence of valid characters, such as Unicode characters, which may validly appear in, for example, a web page or in database, such as in a CHAR or VARCHAR type field.

In some embodiments, an end encrypted portion delineator, such as an end encryption sentinel, or end encrypted portion sentinel, may be output at 438. For example, an end encryption sentinel may be included, subsequent to the encrypted data included at 436, in the partially encrypted output data stream, or the output buffer.

In some embodiments, the end encryption sentinel may be a value or sequences of values that cannot be otherwise included in, or is statistically unlikely to be otherwise included in, the data stream. For example, in some embodiments, an end encryption sentinel may be implemented as a long arbitrary collection of characters, the length and composition of which make it very unlikely that such a sequence would otherwise appear in the data stream in encrypted, unencrypted, or partially encrypted, form. In order to ensure that it is very unlikely that such a sequence would otherwise appear in the data stream, such a sequence may be relatively long, such as a sequence including twenty or more characters.

In some embodiments, an end encryption sentinel may be implemented as a defined value that does not otherwise appear in the data stream, such as a Unicode private character or non-character. For example, the data stream, in encrypted, unencrypted, or partially encrypted form, may include characters encoded according the Unicode character encoding standard, and the end of an encrypted portion may be delineated using a non-character end encrypted portion sentinel. In an example, the non-character end encrypted portion sentinel may be "\uFDEE\uFDEF".

In some embodiments, the proxy, or a state machine thereof, may enter an unencrypted state in response to outputting the end encrypted portion sentinel at 438. In some embodiments, the outbound data received at 400 may include insensitive data, sensitive data, or a combination thereof subsequent to the sensitive data encrypted at 430, and identifying insensitive data at 410, identifying sensitive data at 420, encrypting the sensitive data at 430, may be repeated for the subsequent data as indicated by the broken line in FIG. 4.

In some embodiments, partially encrypted data corresponding to the outbound data received at 400 may be output at 440. For example, the partially encrypted output data stream, or the content of the output buffer, may be stored in memory or transmitted to an external device, such as a sever in another domain. For example, the outbound data received at 400 may include an HTTP GET request, or an HTTP POST, which may include a combination of insensitive and sensitive data in unencrypted form, and addressed to a server outside the customer domain, the proxy may generate partially encrypted data corresponding to the outbound data, which be an HTTP GET request, or an HTTP POST, and which may include a combination of unencrypted insensitive data and encrypted sensitive data, and the proxy may transmit the partially encrypted data to the server.

FIG. 5 is a diagram of an example of decrypting partially encrypted data using selective encryption delineation in accordance with this disclosure. In some embodiments, decrypting partially encrypted data using selective encryption delineation may be implemented on a device, such as the proxy 310 shown in FIG. 3. In some embodiments, decrypting partially encrypted data using selective encryption delineation may include receiving the partially encrypted data at 500, identifying an unencrypted portion at 510, identifying an encrypted portion sentinel at 520, decrypting an encrypted portion at 530, outputting decrypted data at 540, or a combination thereof.

In some embodiments, partially encrypted data may be received at 500. For example, a proxy device, such as the proxy 310 shown in FIG. 3, may be a member of, or operate within, a domain, such as the customer domain 120 shown in FIG. 3, and may receive partially encrypted data, such as an HTTP response, from a device in a remote domain, which may be a domain other than the customer domain, such as a server 132/134 in a domain corresponding to the datacenter 130 as shown in FIG. 3, on behalf of a client, such as the client 322/324 shown in FIG. 3.

For simplicity and clarity, encrypted, or partially encrypted, data received by the proxy from an external device may be referred to herein as inbound data. In some embodiments, the inbound data may include unencrypted data, data encrypted using selective encryption delineation, or a combination thereof. For simplicity and clarity, inbound data, such as an HTTP response, that includes a mixture of unencrypted and encrypted data may be referred to herein as a partially, or selectively, encrypted string, a partially, or selectively, encrypted message, or partially, or selectively, encrypted data.

Although an HTTP formatted response is described as an example herein, any communication format, syntax, or protocol may be used. In some embodiments, a message, such as an HTTP response message may include a portion, such as a body portion or an entity body portion, which may include an arbitrarily large amount of data. The data in the body portion may be formatted in accordance with respective syntax or protocol corresponding to the type of data. The data stream may include a header portion, such as a "Content Type" header, prior to the body portion, which may indicate the type of data. Encoding and decoding of the body portion and corresponding headers may be similar to the encoding and decoding of a URL data stream as described herein. In some embodiments, the inbound data may include information organized according to one or more protocols, such as Hypertext Markup Language (HTML, Extensible Markup Language (XML), JavaScript Object Notation (JSON), Simple Object Access Protocol (SOAP), or any other communication protocol or combination of communication protocols.

In some embodiments, the inbound data received by the proxy at 500 may be received in response to transmitting outbound data, such as the transmitting shown at 440 in FIG. 4. For example, a client in the customer domain may transmit a message, such as a Hypertext Transfer Protocol (HTTP) 'GET' request or a HTTP 'POST', to a server outside the customer domain. The message may be intercepted by the proxy, which may transmit a corresponding encrypted, or partially encrypted, message to the server on behalf of the client. The server may send a response, such as a web page, to the proxy. The response may include encrypted, or partially encrypted, data, the proxy may decrypt the inbound data, may send the decrypted response to the client. Although not expressly described herein, other message types, such as HTTP OPTIONS, HEAD, PUT, DELETE, or the like, may be used.

In some embodiments, receiving the inbound at 500 may include scanning the partially encrypted data. For example, in some embodiments, the inbound data, or portions thereof, may be received as an array or stream of bytes, and the proxy may byte-wise scan the incoming partially encrypted data stream. In some embodiments, scanning the partially encrypted data at 500 may include parsing the partially encrypted data to identify encrypted portions. In some embodiments, the proxy may include a decryption unit, which may include a state machine, and scanning the partially encrypted data may include entering an unencrypted state in response to receiving the partially encrypted data. In some embodiments, scanning the partially encrypted data at 500 may include sequentially evaluating each byte of the partially encrypted data, to determine whether the byte of partially encrypted data includes an encrypted portion sentinel.

In some embodiments, scanning, or parsing, the inbound data at 500 may include scanning, or parsing, the inbound data using selective encryption delineation, and may omit parsing the inbound data stream according to other defined stream protocol or protocols. For example, the inbound data may include may include information organized according to one or more protocols, such as HTTP formatted data, HTML, formatted data, XML, formatted data, or the like, data encrypted using an encryption protocol other than selective encryption delineation, or a combination of protocols or formats other than selective encryption delineation, and scanning, or parsing, the inbound data may omit scanning, parsing, or otherwise interpreting, one or more portions of the inbound data according to the other protocols. In some embodiments, in conjunction with the cryptographic functions of the proxy described herein, the proxy may scan, parse, evaluate, or interpret one or more portions of the inbound data organized, or formatted, using a protocol other than selective encryption delineation for routing the inbound data, such as to identify a source, a destination, or the like, for the inbound data.

In some embodiments, an unencrypted portion may be identified at 510. For example, a first portion of the partially encrypted data may be an unencrypted portion and may be identified at 510. In some embodiments, the proxy may enter an unencrypted state in response to receiving the partially encrypted data at 500, may evaluate a byte of the partially encrypted data, may determine that the byte does not include an encrypted portion sentinel, and may include the byte in an output decrypted data stream, or an output buffer for subsequent inclusion in the output decrypted data stream. Although the portion of the partially encrypted data preceding an encrypted portion sentinel is described herein as unencrypted data, the data may include data encrypted using a technique other than selective encryption delineation.

In some embodiments, an encrypted portion sentinel may be identified at 520. For example, the proxy may evaluate a byte of the partially encrypted data, which may be subsequent to the unencrypted portion identified at 510, and the proxy may determine that the byte includes an encrypted portion delimiter, encryption sentinel, or encrypted portion sentinel. In some embodiments, an encryption sentinel may be a value, or sequences of values, that cannot be otherwise included in, or is statistically unlikely to be otherwise included in, the data stream. For example, in some embodiments, an encryption sentinel may be implemented as a long arbitrary collection of characters, as described herein. In another example, an encryption sentinel may be implemented as a defined value that does not otherwise appear in the data stream, such as a Unicode private character or non-character as described herein. In some embodiments, the encrypted portion sentinel may be omitted from the decrypted output.

In some embodiments, the proxy may decrypt the encrypted portion of the inbound data, which may be the data subsequent to the encrypted portion sentinel in the inbound data, at 530. For example, the proxy may enter an encrypted state in response to identifying the encrypted portion sentinel at 520, and may begin processing the inbound data stream as encrypted data.

In some embodiments, decrypting the encrypted portion of the inbound data at 530 may include identifying encryption metadata. The encryption metadata may, for example, include information for use in decrypting the encrypted data, such as an order-preserving token, an identification of an encryption algorithm used for encrypting the encrypted data, a symbolic name or alias that identifies an encryption key for encrypting or decrypting the encrypted data, or the like. Each metadata parameter, field, or element may be delimited using a respective defined encryption metadata start sentinel and a corresponding defined encryption metadata end sentinel.

In some embodiments, the proxy may byte-wise process the encrypted data, and may identify an encryption metadata sentinel in the encrypted portion of the inbound data. For example, the proxy may evaluate a byte of the encrypted portion of the inbound data, which may be subsequent to the encrypted portion sentinel in the inbound data, and the proxy may determine that the byte includes an encryption metadata sentinel. In some embodiments, the proxy may identify encryption metadata subsequent to the encryption metadata sentinel. In some embodiments, the encryption metadata may be unencrypted data. In some embodiments, the proxy may identify an end encryption metadata sentinel subsequent to the encryption metadata sentinel. In some embodiments, the encryption metadata may be omitted from the decrypted output.

In some embodiments, decrypting the encrypted portion of the inbound data at 530 may include identifying encrypted data, such as base-64 coded encrypted data, subsequent to the end encryption metadata sentinel. In some embodiments, the encrypted portion of the inbound data may omit encryption metadata, and the encrypted data may be identified subsequent to the encrypted portion sentinel.

In some embodiments, decrypting the encrypted portion of the inbound data at 530 may include decrypting the encrypted data. In some embodiments, the encrypted data, which may be included in the encrypted portion subsequent to the metadata, may be binary data produced by an encryption cipher, and may be base64-encoded, which may produce a sequence of valid characters, such as Unicode characters, which may validly appear in, for example, a web page or in database, such as in a CHAR or VARCHAR type field. In some embodiments, a decryption unit at the proxy, may generate decrypted data by applying a cryptographic function to the encrypted data using a decryption key. In some embodiments, cryptographic function, the decryption key, or both, may be defined values or may be identified based on the encryption metadata. In some embodiments, the decrypted data may be included in the output decrypted data stream, or an output buffer for subsequent inclusion in the output decrypted data stream.

In some embodiments, decrypting the encrypted portion of the inbound data at 530 may include identifying an end encrypted portion sentinel in the inbound data. For example, the proxy may evaluate a byte of the encrypted portion of the inbound data, which may be subsequent to the encrypted metadata, and the proxy may determine whether the byte includes an end encryption sentinel. In some embodiments, the byte may omit an end encrypted portion sentinel and the proxy may decrypt the byte as indicated above. In some embodiments, the byte may include an end encrypted portion sentinel and the proxy may enter an unencrypted state in response to identifying the end encrypted portion sentinel. In some embodiments, the end encrypted portion sentinel may be omitted from the decrypted output. In some embodiments, the inbound data received at 500 may include unencrypted data, encrypted data, or a combination thereof subsequent to the data decrypted at 530, and identifying unencrypted data at 510, identifying encrypted portion sentinels at 520, decrypting data at 530, or a combination thereof, may be repeated for the subsequent data as indicated by the broken line in FIG. 5.

In some embodiments, decrypted data corresponding to the inbound data received at 500 may be output at 540. For example, the decrypted output data stream, or the content of the output buffer, may be stored in memory or transmitted to an internal device, such as a client device in the customer domain.

In an example, a client in the customer domain may transmit outbound data, such as an HTTP GET request, or an HTTP POST, which may include insensitive data, sensitive data, or a combination thereof, in unencrypted form, to an external device, such as a server in another domain. The proxy may intercept the request and may generate partially encrypted data corresponding to the outbound data as shown in FIG. 4, and the proxy may transmit the partially encrypted data to the server. In some embodiments, the outbound data received by the proxy may omit sensitive data, and the proxy may send the request to the server in unencrypted form. The unencrypted data, or partially encrypted data sent by the proxy to the external server may be an HTTP GET request, or an HTTP POST, and may include unencrypted insensitive data, encrypted sensitive data, or a combination thereof. In response to the request, the server may send a response to the client, which may include partially encrypted data. The proxy may intercept the response, or otherwise receive the partially encrypted data on behalf of the client, may decrypt the encrypted data, may generate a decrypted output data stream, and may send the decrypted output data stream to the client.

Figure 6:
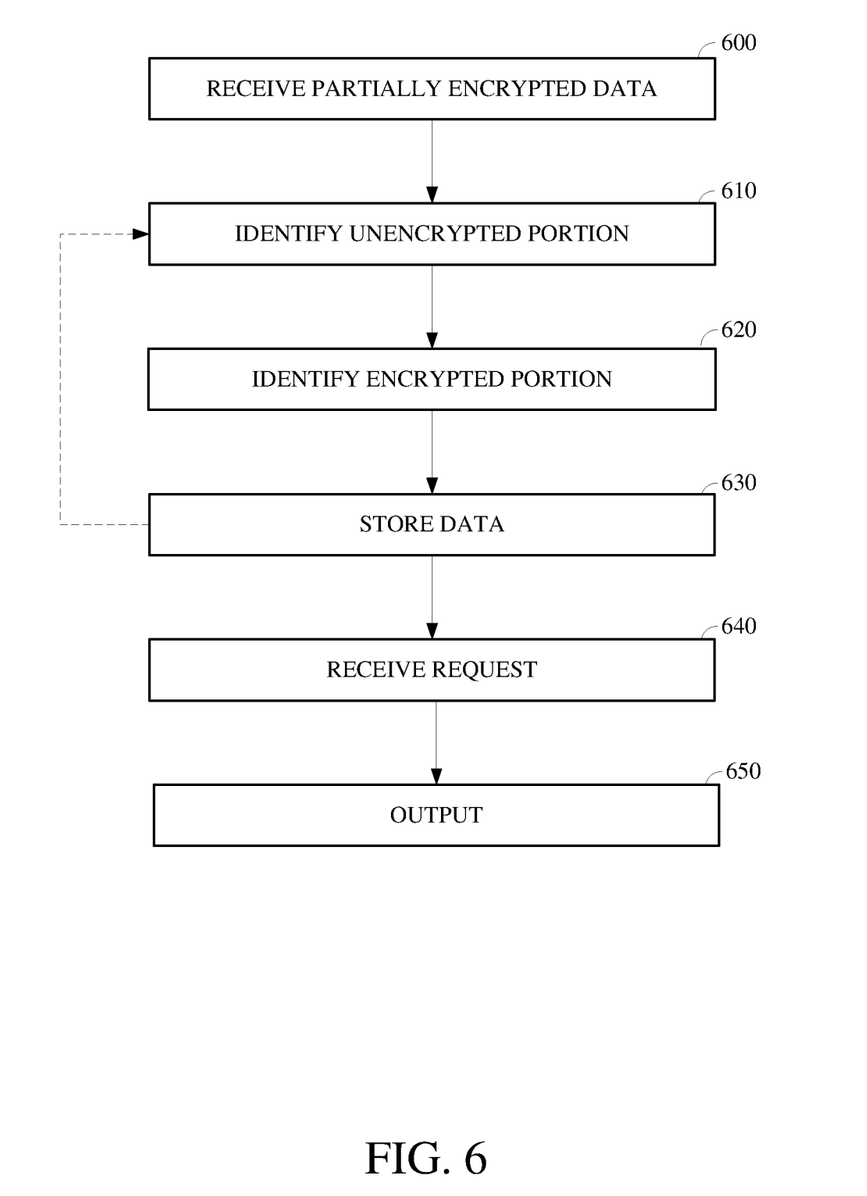
FIG. 6 is a diagram of an example of managing data encrypted using selective encryption delineation in accordance with this disclosure.

FIG. 6 is a diagram of an example of managing data encrypted using selective encryption delineation in accordance with this disclosure. In some embodiments, managing data encrypted using selective encryption delineation may be implemented on a device, such as the server 332/334/342/344 shown in FIG. 3. In some embodiments, managing data encrypted using selective encryption delineation may include receiving partially encrypted data at 600, identifying an unencrypted portion at 610, identifying an encrypted portion at 620, storing data at 630, receiving a request for partially encrypted data at 640, outputting a response including partially encrypted data at 650, or a combination thereof.

In some embodiments, partially encrypted data may be received at 600. For example, a server, such as the server 332/334/342/344 shown in FIG. 3, which may be in a domain other than a customer domain, such as the customer domain 320 shown in FIG. 3, may receive partially encrypted data from a proxy, such as the proxy 360 shown in FIG. 3, which may be in the customer domain, on behalf of a client, such as the client 322/324 shown in FIG. 3, which may be in the customer domain. In some embodiments, the partially encrypted data may include unencrypted data, encrypted data, or a combination thereof. In some embodiments, the encrypted data may be generated using selective encryption delineation. For example, the proxy may generate the partially encrypted data as shown in FIG. 4.

In some embodiments, an unencrypted portion may be identified at 610. For example, in some embodiments, the partially encrypted data, or portions thereof, may be received as an array or stream of bytes, and the server may byte-wise scan the partially encrypted data stream. In some embodiments, scanning the partially encrypted data may include parsing the partially encrypted data. In some embodiments, scanning the partially encrypted data may include sequentially evaluating each byte of the partially encrypted data, to determine whether the byte of partially encrypted data includes an encrypted portion sentinel. In some embodiments, a first portion of the partially encrypted data, which may include one or more bytes, may omit an encrypted portion sentinel, and may be identified as unencrypted data. For example, the partially encrypted data may correspond with Example 1, and the first portion may include unencrypted data corresponding to "HTTP://www.example.com/path?param1=". Although the first portion is described as unencrypted data, the unencrypted data, or a portion thereof, may include encrypted data generated using an encryption technique other than selective encryption delineation, and the server may decrypt the data to identify the unencrypted data.

In some embodiments, an encrypted portion may be identified at 620. For example, the server may determine that the received partially encrypted data includes an encrypted portion sentinel and a subsequent end encrypted portion sentinel, and may identify a portion of the partially encrypted data beginning at the encrypted portion sentinel, or immediately subsequent to the encrypted portion sentinel, and ending at the end encrypted portion sentinel, or immediately prior to the end encrypted portion sentinel, as a selectively encrypted portion. In some embodiments, the server may byte-wise scan the partially encrypted data stream to identify the encrypted portion sentinel, the end encrypted portion sentinel, or both.

In an example, partially encrypted data based on Example 1 may include a first unencrypted portion, such as "HTTP://www.example.com/path?param1=", followed by a first encrypted portion sentinel, followed by a first encrypted portion, which may include an encrypted representation of the value "one" as shown in Example 1, followed by a first end encrypted portion sentinel, followed by a second unencrypted portion, such as "¶m2=", followed by a second encrypted portion sentinel, followed by a second encrypted portion, which may include an encrypted representation of the value "two" as shown in Example 1, followed by a second end encrypted portion sentinel, followed by a third unencrypted portion, such as "&protocol=", followed by a third encrypted portion sentinel, followed by a third encrypted portion, which may include an encrypted representation of "{"param3"."three"; "param4"."four"}" as shown in Example 1, followed by a third end encrypted portion sentinel.

In some embodiments, the partially encrypted data may include encryption metadata associated with encrypted data. For example, the partially encrypted data may include encryption metadata subsequent to an encrypted portion sentinel and prior to a corresponding encrypted portion. In some embodiments, the server may scan the selectively encrypted portion and may identify an encryption metadata start sentinel, followed by some data, followed by a corresponding encryption metadata end sentinel, and may identify the data subsequent to the encryption metadata start sentinel and prior to the corresponding encryption metadata end sentinel as encryption metadata.

In some embodiments, the partially encrypted data may be stored at 630. For example, the partially encrypted data may be stored in a data storage unit, such as a database, associated with the server. In some embodiments, storing the partially encrypted data at 630 may include determining a data storage location, such as a database, table, column, or field to store the partially encrypted data, or a portion thereof. In some embodiments, a data storage location may be identified based on the unencrypted data identified at 610. For example, a field in a database may be identified based on the first unencrypted portion "HTTP://www.example.com/path?param1=".

In some embodiments, storing the partially encrypted data at 630 may include storing encrypted data, such as the encrypted portion identified at 620 in an identified data storage location. For example, a data storage location, such as a field in a database, may be identified based on the first unencrypted portion, "HTTP://www.example.com/path?param1=", identified at 610, and the encrypted data identified at 620, subsequent to the first unencrypted portion, may be stored at the identified data storage location. In some embodiments, storing the encrypted data may omit decrypting the encrypted data. For example, decryption information, such as decryption keys, for decrypting the encrypted data may be inaccessible to the server, such that the server may be effectively incapable of decrypting the encrypted data, and the encrypted data may be stored in encrypted form. In some embodiments, storing the encrypted data may include storing the encrypted portion sentinel, the end encrypted portion sentinel, or both, with the encrypted data. In some embodiments, storing the encrypted data may omit storing the encrypted portion sentinel, the end encrypted portion sentinel, or both.

In some embodiments, the partially encrypted data may include encryption metadata associated with encrypted data, and storing the partially encrypted data at 630 may include storing the encryption metadata in association with the corresponding encrypted data.

In some embodiments, the partially encrypted data received at 600 may include unencrypted data, encrypted data, or a combination thereof, subsequent to the end encrypted portion sentinel identified at 620, and identifying an unencrypted portion at 610, identifying an encrypted portion at 620, storing data at 630, or a combination thereof, may be repeated for the subsequent data as indicated by the broken line in FIG. 6.

In some embodiments, a request for partially encrypted data may be received at 640. For example, a client, such as the client 322/324 shown in FIG. 3, which may be in a customer domain, such as the customer domain 320 shown in FIG. 3, may send a request, such as an HTTP GET request, to a server, such as the server 332/334/342/344 shown in FIG. 3, which may be in a domain other than the customer domain, the request may be intercepted by a proxy, such as the proxy 360 shown in FIG. 3, which may be in the customer domain, and the proxy may send a corresponding request to the sever on behalf of the client.

In some embodiments, output may be generated at 650 in response to receiving the request at 640. For example, a server, such as one or more of the servers 332/334/342/344 shown in FIG. 3, may generate a partially encrypted data stream and may transmit the partially encrypted data stream to the client via the proxy. In some embodiments, generating the partially encrypted data stream may include encrypting one or more portions of the data stream and including the encrypted portions in the output data stream. For example, the server may encrypt data such that decryption information for decrypting the encrypted data is unavailable to the server. In some embodiments, generating the partially encrypted data stream may include identifying one or more previously encrypted portions, such as the encrypted portion stored at 630, and including the previously encrypted portion or portions in the output data stream.

In some embodiments, including the encrypted data in the output data stream may include including an encrypted portion sentinel in the output data stream, including encryption metadata in the output data stream subsequent to the encrypted portion sentinel, base-64 encoding the encrypted data, including the base-64 encoded encrypted data in the output data stream subsequent to the encrypted portion sentinel, or the encryption metadata, including an end encrypted portion sentinel in the output data stream subsequent to the encrypted data, or a combination thereof. Other encrypted and unencrypted data may be similarly included in subsequent portions of the partially encrypted output data stream.

The implementations of the electronic computing and communication system, including clients 112/114/122/124 and servers 132/134/142/144 (and the algorithms, methods, instructions, etc. stored thereon and/or executed thereby), can be realized in hardware, software, or any combination thereof. The hardware can include, for example, computers, intellectual property (IP) cores, application-specific integrated circuits (ASICs), programmable logic arrays, optical processors, programmable logic controllers, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of clients 112/114/122/124 and servers 132/134/142/144 are not necessarily implemented in the same manner.

Further, in an embodiment, for example, clients 112/114/122/124, proxy 310, and servers 132/134/142/144 can be implemented using a special purpose computer/processor, which can contain specialized hardware for carrying out any of the methods, algorithms, or instructions described herein.

Further, all or a portion of embodiments of the present invention can be implemented using a special purpose computer/processor with a computer program that, when executed, carries out any of the respective techniques, algorithms and/or instructions described herein, and which can contain specialized hardware for carrying out any of the techniques, algorithms, or instructions described herein.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein. As used herein, the terminology "generating", or any variations thereof, includes combining, calculating, computing, aggregating, rendering, laying out, drawing, or otherwise producing in any manner whatsoever using one or more of the devices shown and described herein. As used herein, the terminology "automatic", "automatically", "automated", or any variation thereof, including use of the prefix "auto-", includes initiating or executing by one or more of the devices shown and described herein without human intervention. As used herein, the terminology "cardinality" includes a number or count of elements or items in a set, group, plurality, or any other collection of zero or more elements. As used herein, the terminology "receiving" includes receiving via a network, retrieving from memory, or otherwise ascertaining the identified information.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system, comprising:
    a first network device configured to facilitate communication via a network to a data center; and
    a second network device communicatively coupled between a client device and the first network device, wherein the second network device is configured to:
        receive a partially encrypted data stream, the partially encrypted data stream comprising:
            a first unencrypted data portion; and
            an encrypted data portion;
        generate an unencrypted data stream at least in part by:
            including the first unencrypted data portion in the unencrypted data stream;
            identifying an encrypted portion sentinel in the partially encrypted data stream;
            identifying an end encrypted portion sentinel in the partially encrypted data stream subsequent to the encrypted portion sentinel, wherein the end encrypted portion sentinel comprises a set of characters with a length and character combination not occurring in the encrypted data portion;
            identifying, in the partially encrypted data stream, data between the encrypted portion sentinel and the end encrypted portion sentinel as the encrypted data portion;
            decrypting the encrypted data portion in the partially encrypted data stream to generate a second unencrypted data portion; and
            including the second unencrypted data portion in the unencrypted data stream; and
        output the unencrypted data stream to the client device.

2. The system of claim 1, wherein the end encrypted portion sentinel is configured to indicate to the second network device that data included in the partially encrypted data stream subsequent to the end encrypted portion sentinel is decrypted until an additional encrypted portion sentinel is present in the partially encrypted data stream.

3. The system of claim 1, wherein the end encrypted portion sentinel comprises an additional set of characters different than the set of characters of the encrypted portion sentinel.

4. The system of claim 3, wherein the second network device is configured to identify the end encrypted portion sentinel based on the presence of the additional set of characters.

5. The system of claim 1, wherein the set of characters are chosen based upon the set of characters being unlikely to be included in data values of the unencrypted data stream.

6. The system of claim 1, wherein the second network device comprises a proxy device.

7. The system of claim 1, wherein the end encrypted portion sentinel comprises a non-character data value.

8. The system of claim 1, wherein the second network device comprises a state machine comprising an unencrypted state and an encrypted state, and wherein a transition to the unencrypted state is based upon identifying the end encrypted portion sentinel.

9. The system of claim 1, wherein a customer network comprises the client device, wherein the first network device operates outside the customer network, and wherein the second network device is configured to intercept communications that enter or exit the customer network.

10. A method, comprising:
receiving a partially encrypted data stream, the partially encrypted data stream comprising:
a first unencrypted data portion; and
an encrypted data portion;
generating an unencrypted data stream at least in part by:
including the first unencrypted data portion in the unencrypted data stream;
identifying an encrypted portion sentinel in the partially encrypted data stream;
identifying an end encrypted portion sentinel in the partially encrypted data stream subsequent to the encrypted portion sentinel, wherein the end encrypted portion sentinel comprises a set of characters with a length and character combination not occurring in the encrypted data portion;
identifying, in the partially encrypted data stream, data between the encrypted portion sentinel and the end encrypted portion sentinel as the encrypted data portion;
decrypting the encrypted data portion in the partially encrypted data stream to generate a second unencrypted data portion; and
including the second unencrypted data portion in the unencrypted data stream; and
outputting the unencrypted data stream.

11. The method of claim 10, wherein identifying the encrypted portion sentinel in the partially encrypted data stream subsequent to the first unencrypted data portion includes performing byte-wise scanning operations.

12. The method of claim 10, comprising outputting the unencrypted data stream to a customer network, wherein receiving the partially encrypted data stream comprises receiving the partially encrypted data stream from a device external to the customer network.

13. The method of claim 12, wherein the end encrypted portion sentinel comprises a non-character data value.

14. The method of claim 10, wherein the partially encrypted data stream comprises encoded data encoded in accordance with a defined encoding scheme prior to reception.

15. The method of claim 10, wherein receiving the partially encrypted data stream comprises receiving the partially encrypted data in a stream of bytes of data.

16. A non-transitory, tangible, computer-readable storage medium, comprising executable instructions that, when executed by a processor, cause the processor to perform operations comprising:
receiving, from a first domain, a partially encrypted data stream, the partially encrypted data stream comprising:
a first unencrypted data portion; and
an encrypted data portion;
generating an unencrypted data stream at least in part by:
including the first unencrypted data portion in the unencrypted data stream;
identifying an encrypted portion sentinel in the partially encrypted data stream;
identifying an end encrypted portion sentinel in the partially encrypted data stream subsequent to the encrypted portion sentinel, wherein the end encrypted portion sentinel comprises a set of characters with a length and character combination not occurring in the encrypted data portion and the first unencrypted data portion;
identifying, in the partially encrypted data stream, data between the encrypted portion sentinel and the end encrypted portion sentinel as the encrypted data portion;
decrypting the encrypted data portion in the partially encrypted data stream to generate a second unencrypted data portion; and
including the second unencrypted data portion in the unencrypted data stream; and
outputting the unencrypted data stream to a second domain.

17. The non-transitory, tangible, computer-readable storage medium of claim 16, wherein the processor comprises a state machine comprising an unencrypted state and an encrypted state.

18. The non-transitory, tangible, computer-readable storage medium of claim 17, wherein the operations comprise entering the unencrypted state in response to receiving the partially encrypted data stream.

19. The non-transitory, tangible, computer-readable storage medium of claim 16, wherein the operations comprise:
identifying a metadata start sentinel in the partially encrypted data stream subsequent to the first unencrypted data portion and before the encrypted portion sentinel;
identifying a metadata end sentinel in the partially encrypted data stream subsequent to the metadata start sentinel and before the encrypted portion sentinel; and
identifying metadata in the partially encrypted data stream between the metadata start sentinel and the metadata end sentinel.

20. The non-transitory, tangible, computer-readable storage medium of claim 19, wherein the operations comprise decrypting the encrypted data portion in the partially encrypted data stream using the metadata, wherein the metadata comprises an order-preserving token, an indication of an encryption algorithm used for encrypting the encrypted data portion, a symbolic name or alias that identifies an encryption key for encrypting or decrypting the encrypted data, or any combination thereof.

\* \* \* \* \*